(12) United States Patent
Sato

(10) Patent No.: US 7,491,257 B2
(45) Date of Patent: *Feb. 17, 2009

(54) SILVER PARTICLE POWDER AND METHOD OF MANUFACTURING SAME

(75) Inventor: Kimitaka Sato, Okayama (JP)

(73) Assignee: Dowa Electronics Materials Co., Ltd., Tokyo (JP)

( * ) Notice: Subject to any disclaimer, the term of this patent is extended or adjusted under 35 U.S.C. 154(b) by 159 days.

This patent is subject to a terminal disclaimer.

(21) Appl. No.: 11/360,481

(22) Filed: Feb. 24, 2006

(65) Prior Publication Data

US 2006/0199008 A1    Sep. 7, 2006

(30) Foreign Application Priority Data

Mar. 1, 2005    (JP) .............................. 2005-056035

(51) Int. Cl.
*B22F 1/00* (2006.01)
*C22C 5/00* (2006.01)
*B32B 5/16* (2006.01)

(52) U.S. Cl. .......................... 75/255; 148/430; 428/402

(58) Field of Classification Search ................... 75/255; 148/430; 428/402
See application file for complete search history.

(56) References Cited

U.S. PATENT DOCUMENTS

2004/0173666 A1 * 9/2004 Fukunaga et al. ........... 228/202

FOREIGN PATENT DOCUMENTS

| JP | 54-121270 | 9/1979 |
|---|---|---|
| JP | 11-319538 | 11/1999 |
| JP | 2001-35255 | 2/2001 |
| JP | 2003-253311 | 9/2003 |
| JP | 2005-26805 | 2/2005 |
| JP | 2005-26866 | 2/2005 |

* cited by examiner

*Primary Examiner*—Roy King
*Assistant Examiner*—Caitlin Fogarty
(74) *Attorney, Agent, or Firm*—Clark & Brody

(57) ABSTRACT

A fine silver particle powder is provided that is a suitable material for interconnects used to form fine circuit patterns especially by the inkjet method, and a method of manufacturing the powder. Although the powder is fine and therefore has a large specific surface area, it has good weatherability and corrosion resistance. The powder particles have a calculated specific surface area (CS) of 50 $m^2/cm^3$ or more, an X-ray crystal grain diameter ($D_X$) of not more than 50 nm, not more than 10.0 basicity points/$nm^2$ and not more than 10.0 acidity points/$nm^2$. To obtain the silver particle powder, a silver compound is reduced in an organic solvent, using as the reducing agent one, two or more selected from an alcohol or polyol. The reduction reaction proceeds in the presence of an organic protective agent and a polarity inhibition agent.

5 Claims, 2 Drawing Sheets

SILVER PARTICLE POWDER AND METHOD OF MANUFACTURING SAME

FIELD OF THE INVENTION

The present invention relates to a fine (in particular, nanometer-order particle diameter) silver particle powder, and a method of manufacturing the powder. It particularly relates to a silver particle powder and a method of manufacturing the powder that is a suitable material for forming interconnects for fine circuit patterns, such as interconnects formed by the inkjet method, for example. The silver particle powder of this invention is a suitable material for forming interconnects used on LSI substrates, electrode and interconnects of flat panel displays (FPD), and interconnects used for trenches, via holes and contact holes and the like. The material can also be applied to coloring material such as car paint, and to carriers for adsorbing biochemical substances and the like in the areas of medical treatment, diagnosis and biotechnology.

DESCRIPTION OF THE PRIOR ART

When a solid substance reaches nanometer-order sizes, its calculated specific surface area (CS) becomes very large. Thus, although it is a solid, its interface with gas and liquid becomes very large. Consequently, the properties of the solid substance are greatly influenced by the surface characteristics. In the case of metal particle powder, it is known that the melting point thereof is dramatically reduced compared to the bulk state, which gives it various advantages compared to micrometer-order particles, such as the ability to form finer interconnects, and low-temperature sinter capability. Silver particle powder has low electrical resistance and good weatherability, and is cheaper than other noble metals, and as such is being looked to as a material for forming the next generation of fine interconnects.

Methods of manufacturing nanometer-order silver particle powder are broadly divided into the vapor phase method and the liquid phase method. The vapor phase method is usually a vapor deposition method carried out in a gas. JP 2001-35255 A (Reference No. 1) describes such a method of using vapor deposition of silver in an inert gas atmosphere such as helium at a reduced pressure in the order of 0.5 Torr. With respect to the liquid phase method, JP11-319538 A (Reference No. 2) discloses a method of obtaining a silver colloid by aqueous phase reduction of silver ions using an amine, and moving the silver deposition phase thus obtained to an organic solvent phase (polymeric dispersant), and JP 2003-253311 A (Reference No. 3) describes a method in which a reducing agent (alkaline metallic borohydride or ammonium borohydride) is used to reduce a silver halide in a solvent in the presence of a thiol-based protective agent. JP 54-121270 A (Reference No. 4) describes a method of obtaining silver powder by reducing silver nitrate in a solution of water and formalin.

OBJECT OF THE INVENTION

The silver particles obtained by the vapor phase method of Reference No. 1 have fine diameter and good dispersibility in solvent. However, the technology requires a special apparatus, which makes it difficult to synthesize large quantities of silver nanoparticles for industrial use. In contrast, while basically the liquid phase method is suitable for large-volume synthesis, the agglomeration of metal nanoparticles in the liquid is very high, making it difficult to obtain a nanoparticulate powder dispersed to single particles. In most cases, citric acid is used as the dispersant when manufacturing metal nanoparticles, and the metal ion concentration in the liquid is usually a very low 10 mmol/L (=0.01 mol/L). This is an obstacle in terms of industrial application.

Using a high metal ion concentration of 0.2 to 0.6 mol/L, the method of Reference No. 2 synthesizes silver nanoparticles that are stably dispersed and have a high concentration of the source material. However, in order to suppress agglomeration, it uses a polymeric dispersant having a high number average molecular weight of several tens of thousands. The use of such a dispersant poses no problem when the silver nanoparticles are to be used as a coloring material. When the particles are to be used in circuit fabrication, however, it is necessary to use a firing temperature that is equal to or above the polymer boiling point, in addition to which pores readily arise in the interconnects after the firing, so there are problems of high resistance and broken interconnects which make the particles less than suitable for fine interconnect applications.

The method of Reference No. 3 uses a reaction with a relatively high concentration of 0.1 mol/L or more to obtain silver particles of 10 nm or below that are dispersed using a dispersant. The disclosure describes the use of a thiol-based dispersant having a low molecular weight in the order of 200, which makes it possible to make use of low-temperature firing during interconnect formation. However, the thiol-based surfactant contains sulfur (S), and sulfur causes corrosion of interconnects and other electronic components, making it an unsuitable element for interconnect formation applications.

Although silver has good weatherability and corrosion resistance, when the particle size decreases and the CS rises to 50 $m^2/cm^3$ or more, it becomes active and prone to the corrosive effects of oxidation and sulfurization. Therefore, even when the silver powder has a small particle size and an even particle size distribution, its high activity and hence its proneness to oxidation and corrosion make it very difficult to handle. Therefore, until firing, the powder particles have to be handled in an inert atmosphere or given a special coating.

Therefore, the object of the present invention is to provide a silver spherical-particle powder that has an even particle size distribution suitable for forming fine interconnects, the fluid dispersion of which can be obtained cheaply and in large, high-yield quantities, in addition to which the silver particle powder has good corrosion resistance and oxidation resistant characteristics that make it difficult to adsorb molecules of acid and alkali corrosive substances.

SUMMARY OF THE INVENTION

To attain the above object, the present invention provides a silver particle powder having a calculated specific surface area (CS) of 50 $m^2/cm^3$ or more, an X-ray crystal grain diameter ($D_X$) of not more than 50 nm, not more than 10.0 basicity points/$nm^2$ and not more than 10.0 acidity points/$nm^2$. The invention also provides a silver particle powder having a calculated specific surface area (CS) of 50 $m^2/cm^3$ or more and an X-ray crystal grain diameter ($D_X$) of not more than 50 nm, to the particle surface of which is adhered an organic protective agent (typically one, two or more selected from among fatty acids and amino compounds) having a molecular weight of from 100 to 1000.

The invention also provides a method of manufacturing the silver particle powder by reducing a silver compound in an organic solvent, in which the organic solvent is one, two or more selected from an alcohol or polyol having a boiling point of 85° C. or higher that function as a reducing agent, and the reduction reaction proceeds in the presence of an organic protective agent (typically one, two or more selected from among fatty acids and amino compounds) and a polarity inhibition agent (typically a hydrocarbon having a boiling point of 85° C. or higher).

The silver particle powder thus obtained is dispersed in a non-polar or low-polarity dispersion medium having a boiling point of 60° C. or higher, and coarse particles are separated out from the dispersion thus obtained to obtain a disperse system in which fine silver particles are independently dispersed, having an average particle diameter ($D_{50}$) of not more than 100 nm, as measured by the dynamic light-scattering method, and a degree of dispersion ($D_{50}$)/($D_{TEM}$) of not more than 5.0.

In accordance with this invention, it is possible to stably obtain silver particle powder that, although fine and having a large specific surface area, has good weatherability and corrosion resistance.

DETAILED DESCRIPTION OF THE INVENTION

The present inventor conducted numerous experiments to manufacture silver powder having nanometer-sized particles by the liquid phase method, and found that it was possible to obtain spherical particles of silver having a uniform particle diameter, by reducing silver nitrate in alcohol having a boiling point of from 85 to 150° C., at a temperature of from 85 to 150° C. (while refluxing vaporized alcohol to the liquid phase) in the co-presence of a protective agent constituted by an amino compound having a molecular weight of 100 to 400, for example, which is the invention described in the specification and drawings of Japanese Patent Application No. 2005-26805. The present inventor also found that it was possible to obtain spherical particles of silver having a uniform particle diameter, by reducing a silver compound (typically, silver carbonate or silver oxide) in alcohol or polyol having a boiling point of 85° C. or higher, at a temperature of 85° C. or higher (while refluxing vaporized alcohol to the liquid phase) in the co-presence of a protective agent constituted by a fatty acid having a molecular weight of 100 to 400, for example, which is the invention described in the specification and drawings of Japanese Patent Application No. 2005-26866. In each case, the silver particle powder is dispersed in a non-polar or low-polarity dispersion medium to obtain a dispersion of silver particles, from which centrifugal separation or the like is used to remove coarse particles to obtain a monodispersion of silver particles with a low variation in particle diameter (CV value=standard deviation σ/average particle diameter, which is less than 40%).

Figure 1:
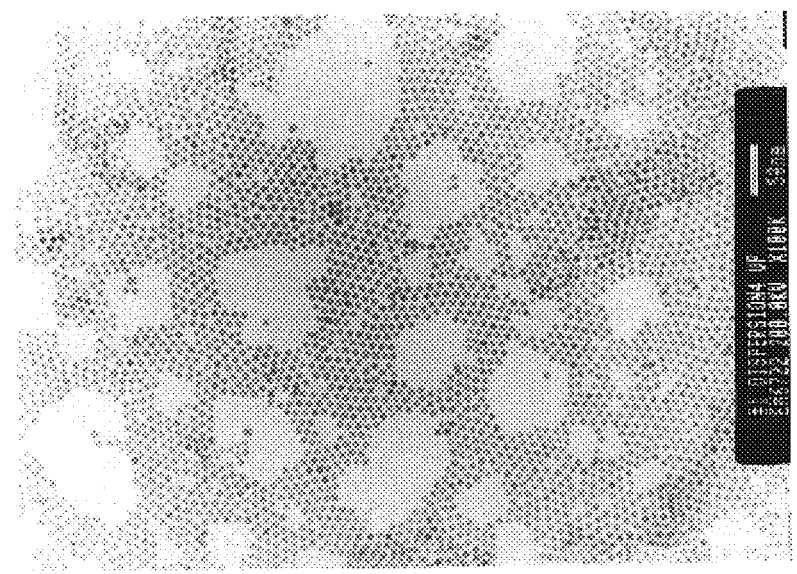
FIG. 1 is a TEM photograph showing a monodispersion of silver particles.
Figure 2:
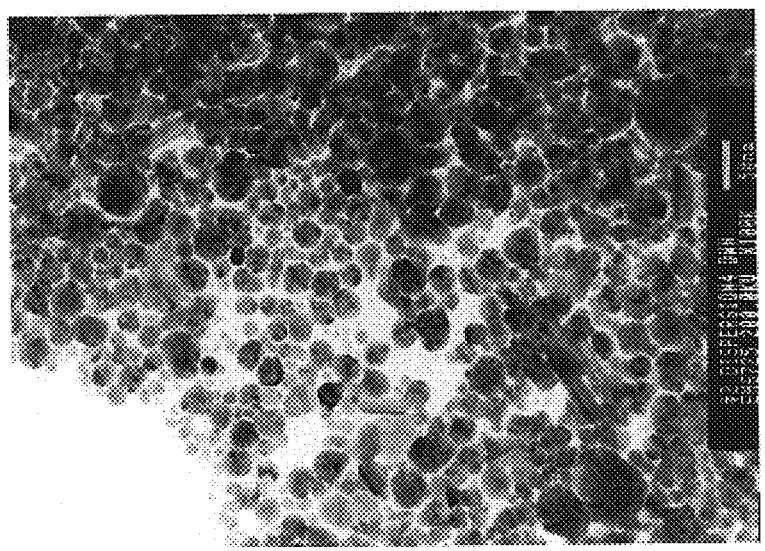
FIG. 2 is a TEM photograph showing the silver particles immediately after the reduction reaction.

However, when classified to produce a CV value of less than 40%, the yield of silver particles present in the independent suspension of silver particles (hereinafter "monodispersion") after removing coarse particles is lower. Hereinafter the yield of silver particles is called as "monodispersion ratio". FIG. 1 is a TEM (transmission electron microscope) photograph of a silver monodispersion obtained in example 1 of the above-mentioned Japanese Patent Application No. 2005-26805 (average particle diameter 6.6 nm: CV value=10.5%). The monodispersion of FIG. 1 was obtained by classifying the silver particle powder slurry directly following the reaction, shown in FIG. 2 (also a TEM photograph). This classification operation uses the centrifugal separation method described in columns 0029 and 0030 of Japanese Patent Application No. 2005-26805 to remove coarse particles. As shown in FIG. 2, most of the coarse particles are included immediately after the reaction, and when obtained in the case of the monodispersion of FIG. 1, the monodispersion ratio is 31.2%, with the remainder being coarse particles. That is to say, a nanometer-order particle monodispersion having uniform particle diameters can be obtained by removing 68.9% of the silver particles, so the yield (monodispersion ratio) was low.

Based on further research, it was found that a high yield of silver particle powder having a high level of dispersibility could be obtained by performing the reduction reaction using a hydrocarbon as a polarity inhibition agent. It was also found that the number of acidity points and basicity points of the obtained silver particle powder could be decreased by appropriately modifying the polarity of the reaction medium solvent. Conceivably, this can be due to the fact that the solution polarity is reduced by adding the hydrocarbon to the alcohol or polyol used as the solvent/reducing agent, enabling the silver particles on which the fatty acid or amine compound or the like constituting the protective agent is adsorbed to exist stably in the liquid without agglomerating, helped also by the modification of the particle surface state caused by the modification of the solvent polarity.

Thus, in accordance with this invention, it is possible to obtain a silver particle powder having a calculated specific surface area (CS) of 50 $m^2/cm^3$ or more, an X-ray crystal grain diameter ($D_X$) of not more than 50 nm, and not more than 10.0 basicity points/$nm^2$ and not more than 10.0 acidity points/$nm^2$. An organic protective agent having a molecular weight of from 100 to 1000 is adsorbed on the surface of the particles, and, as calculated from the CS, the relationship between the average particle diameter $D_{50}$ and the $D_X$ is $D_{50}/D_X<10$.

Items defined by the invention are explained as follows.

Calculated Specific Surface Area (CS) (Unit $m^2/cm^3$)

In accordance with this invention, the calculated specific surface area (CS) is 50 $m^2/cm^3$ or more. When it is assumed that all particles are spherical, based on the particle size distribution as measured by the dynamic light-scattering method, the CS can be calculated as:

$$CS=(6/MA)$$

where MA is mean area diameter, which is the mean diameter weighted by the area. Here, a single particle population is assumed, in which, in order from the smallest diameter, particles having the diameter d1, d2, d3 ... di ... dk, number n1, n2, n3 ... ni ... nk, respectively. Also, a particle is taken to have a surface area of ai and a volume of Vi, and in each case the particle is assumed to be spherical. Then, MA is obtained as follows.

$$MA=\Sigma(ai \cdot di)/\Sigma(ai)=\Sigma(Vi)/\Sigma(Vi/di)$$

In practice, these values can be obtained by measuring the liquid in which the silver particles are dispersed by the dynamic light-scattering method or laser diffraction method. That is to say, with the Microtrack measurement, this is calculated automatically along with the $D_{50}$.

X-Ray Crystal Grain Diameter ($D_X$)

The silver nanoparticles of this invention have an X-ray crystal grain diameter ($D_X$) of not more than 50 nm. The Scherrer formula can be used to obtain the crystal grain diameter from the results of the X-ray diffraction measurement of the crystal grain diameter. The Scherrer formula is expressed by the general formula $$D = K \cdot \lambda / \beta \cos \theta$$

in which K is Scherrer constant, D is crystal grain diameter, $\lambda$ is wavelength of measuring X-ray, $\beta$ is the half-value width of the peak obtained by X-ray diffraction, and $\theta$ is the Bragg angle of the diffraction line. If a value of 0.94 is employed for K and a copper X-ray is used, the above formula can be rewritten as follows.

$$D = 0.94 \times 1.5405 / \beta \cos \theta$$

Number of Basicity Points and Acidity Points

The number of basicity points present on the particle surface can be evaluated from the number of acidic-substance molecules adsorbed on the surface. If one acidic substance is adsorbed on one basicity point, the number of adsorbed acidic-substance molecules will correspond to the number of basicity points. There is a good correlation between the number of basicity points of the silver powder particles and the amount of $CO_2$ adsorption (microliters ($\mu$L)/g) by the particles, and a good correlation between the number of acidity points and the amount of $NH_3$ adsorption ($\mu$L/g), so herein, these correlations are used to evaluate the number of basicity points and acidity points of the silver powder particles. The actual measurement is done as follows.

Evaluating Basicity Points

The powder to be measured is placed in a ChemBET-3000 chemisorption analyzer manufactured by Quantachrome Corporation and, using high-purity $CO_2$ as the adsorption gas, the amount of $CO_2$ adsorption ($\mu$L) per gram of the sample powder is measured. In accordance with the instrument's operating procedure, dehydration of water adhering to the powder is effected by heating the sample in an inert gas such as $N_2$ or argon, and air present in the measurement path is purged also by using an inert gas. Then, the $CO_2$ gas is fed to the sample, and measurement of the $CO_2$ adsorption amount is initiated.

Evaluating Acidity Points

The powder to be measured is placed in the ChemBET-3000 chemisorption analyzer and, using high-purity $NH_3$ as the adsorption gas, the amount of $NH_3$ adsorption ($\mu$L) per gram of the sample powder is measured. In accordance with the instrument's operating procedure, dehydration of water adhering to the powder is effected by heating the sample in an inert gas such as $N_2$ or helium, and air present in the measurement path is purged also by using an inert gas. Then, the $NH_3$ gas is fed to the sample, and measurement of the $NH_3$ adsorption amount is initiated.

The number of basicity points or acidity points can be calculated from the amount of $CO_2$ or $NH_3$ that is adsorbed, in accordance with the following standards. If Q ($\mu$L/g) is the measured amount of $CO_2$ adsorbed by a silver powder, P is the specific surface area of the powder (m$^2$/g), G (g/L) is the density of the adsorbed gas (measured at a room temperature of 25° C.), and N is the Avogadro constant ($6.02 \times 10^{23}$ molecules/mol), the number of basicity points (points/nm$^2$) can be calculated as follows.

Number of Basicity Points (points/nm$^2$) = {$N \cdot Q((\mu L/g)$
·G(g/L)·$10^{-24}$}/{P(m$^2$/g)·(molecular weight of $CO_2$:44)}

In the same way, if R ($\mu$L/g) is the weight of the adsorbed $NH_3$, the number of acidity points (points/nm$^2$) can be calculated as follows.

Number of Acidity Points (points/nm$^2$) = {$N \cdot R((\mu L/g)$
·G(g/L)·$10^{-24}$}/{P(m$^2$/g)·(molecular weight of $NH_3$:17)}

In addition, taking p as the density of the gas in a standard state (0° C., 1 atmosphere) (using $\rho = 0.7710$ g/L in the case of $NH_3$ and $\rho = 1.9769$ g/L in the case of $CO_2$), the density G (g/L) of each adsorbed gas can be calculated as follows.

$$G(g/L) = \rho \times (273.15/298.15)$$

From the above relationships, when $CO_2$ or $NH_3$ is used as the adsorbed gas, the number of basicity points or acidity points is found by substituting the respective constant into the formula concerned, as follows.

Number of basicity points (points/nm$^2$) = 0.024779 × Q/P and

Number of acidity points (points/nm$^2$) = 0.0250131 × R/P

Also, herein, the specific surface area P of the powder particles is obtained by multiplying the above-described CS (calculated specific surface area in unit m$^2$/cm$^3$) by the density of silver (a reference value of 10.50 g/cm$^3$).

It was found that if the silver powder is one in which the number of basicity points measured by this method is not more than 10.0 points/nm$^2$, and the number of acidity points also is not more than 10.0 points/nm$^2$, even though the particles are so fine and active as having a specific surface area of 50 m$^2$/cm$^3$ or more, the powder has high weatherability and does not readily oxidize, even when handled in the atmosphere, and also has good corrosion resistance with respect to sulfurization and the like.

Monodispersion Ratio

When the case of FIG. 1 is classified to produce a CV value of less than 40% from the particulates of FIG. 2, the monodispersion ratio of the silver particles present in the independent silver particle disperse system (monodispersion) is decreased by an amount corresponding to the amount of coarse particles removed. The lower the monodispersion ratio, the higher the numbers of sintered particles and strongly agglomerated silver particles present. Unless such secondary particles and coarse particles are removed, the CV value will rise to 40% or more, making the powder an unsuitable interconnect material. The monodispersion ratio is obtained in accordance with the following formula.

Monodispersion ratio (%) = (weight of silver particles in monodispersion/theoretical yield calculated from the incorporated source material) × 100

The weight of the silver particles in the monodispersion is calculated by the procedure described below, after the following washing, dispersion and classification steps.

Washing Step:
(1) Following the reaction, 40 mL of the slurry is centrifuged at 3000 rpm for 30 minutes in a CF7D2 centrifuge manufactured by Hitachi Koki Co., Ltd. to separate solid from liquid, and the supernatant is discarded.
(2) 40 mL of ethanol is added to the precipitate, which is dispersed therein using an ultrasonic disperser.
(3) The preceding (1) to (2) are repeated three times.
(4) The preceding (1) is performed and the supernatant discarded.

Dispersion Step:
(1) 40 mL of kerosene is added to the precipitate from the above washing step.

(2) Then, an ultrasonic disperser is applied.

Classification Step:
(1) Following the dispersion step, 40 mL of the silver particles and kerosene mixture is centrifuged at 3000 rpm for 30 minutes in the CF7D2 centrifuge to separate solid from liquid.
(2) The supernatant is recovered. The supernatant will constitute the independent silver particle powder disperse system that is the monodispersion.

Method of Calculating Weight of Silver Particles in Monodispersion
(1) The monodispersion obtained from the above classification step is transferred to a vessel of known weight.
(2) The vessel is placed in a vacuum drier and, taking full care to avoid any bumping, the degree of vacuum and the temperature are increased to effect concentration and drying. When liquid can no longer be observed, heating at 240° C. for 12 hours is carried out in the vacuum state.
(3) After cooling to room temperature, the particles are removed from the vacuum drier and weighed.
(4) The weight of the vessel is subtracted from the weight obtained in the preceding (3) to thereby obtain the weight of silver particles in the monodispersion.
(5) The value obtained in the preceding (4) is used to calculate the monodispersion ratio in accordance with the above formulas.

The dynamic light-scattering method or the laser diffraction method is used to measure the particle size distribution of the monodispersion obtained in the above classification step, and this particle size distribution is used to obtain the CS by the method described in the foregoing. For the X-ray diffraction measurement, a non-reflecting substrate is coated with the monodispersion concentrated by the vacuum drying.

The silver particle powder according to this invention preferably has a TEM diameter ($D_{TEM}$) of not more than 100 nm, an aspect ratio of not more than 2.0, a CV value of not more than 40%, and a single-crystallinity of not more than 5.0. These are described below.

TEM Diameter ($D_{TEM}$)

The silver nanoparticles according to this invention have an average diameter ($D_{TEM}$), measured by observation of the monodispersion with a TEM (transmission electron microscope), that preferably is not more than 100 nm. An average value is obtained by measuring the diameter of 300 particles selected at random from a TEM image enlarged 600,000 times. The aspect ratio and CV value are also obtained in the same way, from observation.

Aspect Ratio

The aspect ratio (long diameter/short diameter ratio) of the silver powder particles of this invention is preferably not more than 2.0, which is suitable for forming interconnects. If the aspect ratio exceeds 2.0, particle packing is degraded when the particle dispersion is coated on a substrate and dried, giving rise to pores during firing, increasing the resistance and, in some cases, breakage of interconnects.

CV Value

The CV value is an index of particle diameter variation, with a lower CV indicating more uniform particle diameters. The CV value is expressed as:

$$CV=100\times(\text{standard deviation }\sigma)/(\text{average particle diameter}).$$

In the case of the present invention, the particle CV value is preferably not more than 40%, and more preferably is less than 25%, which is suitable for interconnect applications. If the CV value exceeds 40%, as in the above case, particle packing is degraded, giving rise to pores during firing and increasing the resistance, and can cause breakage of interconnects.

Single-Crystallinity

Single-crystallinity is expressed as:

$$\text{Single-crystallinity} = \frac{(TEM \text{ particle diameter})}{(\text{X-ray crystal grain diameter})}$$
$$= D_{TEM}/D_X$$

Single-crystallinity roughly corresponds to the number of crystals in one particle. A large single-crystallinity signifies the particles concerned are constituted of polycrystals. The single-crystallinity in the case of the particles of this invention is preferably not more than 5.0, signifying few crystal grain boundaries in the particles. The higher the number of crystal grain boundaries is, the higher the electrical resistance becomes. Thus, the silver particles of this invention have a low single-crystallinity, and therefore a low resistance, making them suitable for using as conductive members.

Average Particle Diameter Measured by Dynamic Light-Scattering Method

In the dispersion medium, the silver particles of the invention have an average diameter ($D_{50}$), as measured by the dynamic light-scattering method, of not more than 100 nm, and a degree of dispersion ($D_{50}$)/($D_{TEM}$) of not more than 5.0. The silver particle powder is readily dispersed in the dispersion medium and forms a stable dispersion state therein.

The dynamic light-scattering method enables the dispersion state of the silver particle powder in the dispersion medium to be evaluated, and also enables the average particle diameter to be calculated. The principle of the method is that, generally, the location and orientation of particles having a diameter in the range of 1 nm to 5 µm are being constantly changed in the dispersion medium by Brownian motion as moving ahead and rotation, and by projecting a laser beam at the particles and detecting the light scattered by the particles, the fluctuations in scattered light intensity caused by the Brownian motion are measured. Measuring these time-based fluctuations in the scattered light intensity enables the velocity of the Brownian motion of the particles (the diffusion coefficient) to be obtained and, in addition, the size of the particles. When the average diameter of the particles in the dispersion is measured based on this principle, and the measured value is close to the average particle diameter obtained by TEM observation, it signifies that the particles in the liquid are individually dispersed (not attached to each other or agglomerated). That is, the particles in the dispersion medium are spaced apart from each other and therefore can move independently.

When the average particle diameter of the silver particles of the invention in the dispersion medium obtained by the dynamic light-scattering method is compared to the average particle diameter obtained by TEM observation, they are shown to be not so different. That is, the average particle diameter measured by the dynamic light-scattering method is not more than 100 nm, preferably not more than 50 nm, and more preferably not more than 30 nm, which is not very different from the average particle diameter obtained by TEM observation. This shows that a monodispersed state has been achieved, so that in accordance with this invention, a disperse system is provided in which the silver nanoparticles are independently dispersed in the dispersion medium.

There are cases in which, even when the particles are in a completely monodispersed state, there are differences from the average particle diameter obtained by TEM observation, due to measurement error and the like. For example, the concentration of the dispersion medium during the measurement must be suitable for the performance and scattered light detection system of the measurement apparatus. Errors are caused by measuring at a concentration that does not ensure sufficient transmission of light. Moreover, when measuring nanometer-order particles, the received signal strength is so weak that the effect of any dirt or dust will be strong enough to cause errors, so care must be taken prepare samples and ensure the cleanliness of the measurement environment. To ensure that a strong scattered light intensity is obtained when measuring nanometer-order particles, the laser source used should have an output power of at least 100 mW. Moreover, it is known that when the dispersion medium is adsorbed on the particles, the medium adsorption layer will also have an effect, increasing particle diameter even when the particles are completely dispersed. This effect becomes particularly pronounced when particle diameters go below 10 nm. Thus, while it will not be exactly the same as when TEM observation yields an erroneous value even in the case of dispersed particles, it can be considered that a good dispersion is maintained if the degree of dispersion $(D_{50})/(D_{TEM})$ is not more than 5.0, and preferably not more than 3.0. If $(D_{50})/(D_{TEM})$ exceeds 5.0, the particles in the dispersion medium agglomerate, and it was found that when such a dispersion system is applied and fired to use as interconnects, it causes breakages of interconnects and elevated resistance.

Next, the method of manufacturing the silver particle powder of the invention is described.

Manufacturing Method

The silver particle powder of the invention can be manufactured by reducing a silver compound (such as a silver salt or silver oxide) in alcohol or polyol having a boiling point of 85° C. or higher in the presence of an organic protective agent. By proceeding the reduction reaction in the presence of the organic protective agent together with an appropriate polarity inhibiting agent, it is possible to obtain silver powder particles with a high monodispersion ratio. The organic protective agent used is one, two or more selected from among fatty acids and amino compounds having a molecular weight of from 100 to 1000, and the polarity inhibition agent used is a hydrocarbon having a boiling point of 85° C. or higher.

The alcohol or polyol having a boiling point of 85° C. or higher functions as a silver-compound reducing agent and reaction system solvent. Preferred alcohols include isobutanol and n-butanol. The reduction reaction may be carried out under refluxing condition by repeatedly evaporating and concentrating the solvent and reducing agent by heating. Silver compounds that can be used include silver chloride, silver nitrate, silver oxide, and silver carbonate, but from the industrial standpoint, silver nitrate is preferred but the silver compound is not limited thereto. In the method of this invention, the reaction may be carried out with a solution Ag ion concentration of 50 mmol/L or more.

The organic protective agent may be a fatty acid or amino compound having a molecular weight of from 100 to 1000, particularly a metal coordinated compound having a silver coordination. When a compound is used that has no silver coordination or a low coordination, it requires an impractically large amount of protective agent to fabricate silver nanoparticles. Metal coordinated compounds include isonitrile compounds, sulfur compounds, amino compounds, and fatty acids having a carboxyl group. However, the sulfur content of sulfur compounds can cause corrosion that degrades the reliability of electronic components, isonitrile compounds are toxic. There are no such problems with amino compounds and fatty acids. Among amino compounds, primary amines are preferable. There is an aversion to using secondary and tertiary amines, since they themselves act as reducing agents so in a system in which alcohol is already being used as the reducing agent, it would mean there would be two types of reducing agent, making it difficult to control the reaction speed and the like. The fatty acid or amino compound used should have a molecular weight of from 100 to 1000. With a molecular weight that is less than 100, the agglomeration-suppression effect is reduced, while if the molecular weight exceeds 1000, the agglomeration-suppression capability is high but the boiling point is also elevated, so that when the silver particles dispersion system are coated on a substrate and fired, sintering of particles is impeded, increasing the resistance of interconnects and, in some cases, leading to a loss of conductivity.

The hydrocarbon used as the polarity inhibiting agent should be compatible with the alcohol and/or polyol constituting the solvent/reducing agent, have a melting point that is not above 30° C. and a boiling point of 85° C. or above. A melting point that is over 30° C. is undesirable from an industrial standpoint, since during handling constant heating is required. If the boiling point is less than 85° C., it is difficult to elevate the reaction temperature to 85° C. or above without using a special reactor such as an autoclave. At a reaction temperature of less than 85° C. is undesirable, as the reaction capability is very weak, greatly decreasing the silver precipitation amount. An amount of polarity inhibiting agent should be used that is equivalent to 5 to 90% of the total liquid amount. If it is less than 5%, the ability to increase the dispersion efficiency is low, as is the ability to decrease the number of basicity points and acidity points. However, it is also undesirable for the amount to exceed 90%, since the polarity becomes too low, producing an excessive decrease in the solubility of the silver nitrate or other silver source material that results in an uneven reaction system. Hydrocarbons that can be used as the polarity inhibiting agent include amylbenzene, isopropylbenzene, ethylbenzene, xylylene, dimethylbenzene, octane, dipentene, decane, decalin, tetralin, kerosene, dodecane, tetradecane, toluene, benzene, and heptane.

EXAMPLE 1

93.5 mL of tetradecane (made by Tokyo Kasei Co., Ltd.) used as a polarity inhibiting agent was added to 140 mL of isobutanol (made by Wako Junyaku Kogyo Co., Ltd.) used as a solvent/reducing agent, and the addition of 92.92 mL of oleyl amine (Wako Junyaku Kogyo) used as an organic protective agent, and 9.609 g of silver nitrate crystals (made by Kanto Kagaku Co., Ltd.) constituting the silver compound, and the mixture was stirred with a magnetic stirrer to dissolve the silver nitrate.

The solution was transferred to a container with a reflux condenser which was then placed in an oil bath and stirred by magnetic stirrer at 200 rpm and heated while nitrogen gas used as an inert gas was blown into the container at the rate of 400 mL/min. The solution was heated to 100° C. at 2° C./min and refluxed for 5 hours at that temperature to complete the reaction.

After concluding the reaction, the slurry was washed, dispersed and classified as described in the foregoing, and the properties evaluated by the method described herein. The monodispersion ratio was found to be 81.5%. Also, the silver particle powder of the monodispersion was found to have a TEM average particle diameter of 7.0 nm, an aspect ratio of 1.2, a CV value of 15.2%, a CS of 228.18 m$^2$/cm$^3$, an average particle diameter by dynamic light-scattering method ($D_{50}$) of 26.4 nm, a dispersion degree of 3.77, an X-ray crystal grain diameter ($D_X$) of 8.7 nm, a single-crystallinity of 1.24, 0.08 basicity points/nm$^2$, and 0.70 acidity points/nm$^2$.

EXAMPLE 2

The same procedure as Example 1 was repeated, except that dodecane instead of tetradecane was used as the polarity inhibiting agent, and the properties of the monodispersion thus obtained were evaluated in the same way. The monodispersion ratio was found to be 61.7%, the silver particle powder of the monodispersion was found to have a TEM average particle diameter of 7.4 nm, an aspect ratio of 1.1, a CV value of 18.0%, a CS of 180.52 m$^2$/cm$^3$, a $D_{50}$ of 31.0 nm, a dispersion degree of 4.19, a $D_X$ of 7.8 nm, a single-crystallinity of 1.05, 0.11 basicity points/nm$^2$, and 0.89 acidity points/nm$^2$.

COMPARATIVE EXAMPLE 1

The same procedure as Example 1 was repeated, except that propanol instead of isobutanol was used as the solvent/reducing agent and the reaction temperature was changed to 80° C. Following the reaction, the silver yield in the slurry was found to be a very low 1.1%. In the X-ray diffraction analysis of the precipitate, only silver-based peaks were observed, and the $D_X$ was 15.9 nm. Because of the small sample amount, other measurements could not be performed.

COMPARATIVE EXAMPLE 2

The same procedure as Example 1 was repeated, except that ethanol instead of isobutanol was used as the solvent/reducing agent and the reaction temperature was changed to 75° C. Following the reaction, the silver yield in the slurry was found to be a very low 0.9%. In the X-ray diffraction analysis of the precipitate, only silver-based peaks were observed, and the $D_X$ was 25.4 nm. Because of the small sample amount, other measurements could not be performed.

As can be seen in these comparative examples, the silver yield was very low and productivity was not good, when the alcohol used had a boiling point of less than 85° C. and the reaction temperature was less than 80° C.

COMPARATIVE EXAMPLE 3

Figure 3:
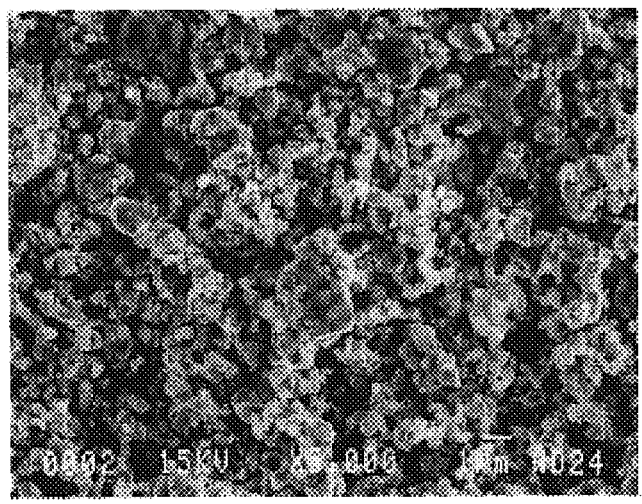
FIG. 3 is a TEM photograph showing the silver particles of a comparative example.

The method described in Reference No. 3 was used to manufacture silver particle powder by a wet reduction method using an aqueous solvent. Following the reduction reaction, the slurry was filtered and washed, dried for 12 hours at 60° C. in an vacuum drier, a sample shredded in a sample mill, 0.45 g of the shredded sample was added to 20 mL of IPA and dispersed with an ultrasonic homogenizer, and the laser diffraction method was used to measure the specific surface area of the particles. The particles were found to have a CS of 0.734 m$^2$/cm$^3$, a $D_{50}$ of 3.01 nm, a $D_X$ of 34.8 nm, a single-crystallinity of 86.49, 0.04 basicity points/nm$^2$ and 204.90 acidity points/nm$^2$. FIG. 3 is a SEM (scanning electron microscope) photograph of the silver particle powder that was obtained. As can be seen in FIG. 3, the particles have irregular shapes, which made it impossible to measure the TEM particle diameter, aspect ratio and CV value.

What is claimed is:

1. A silver particle powder having a calculated specific surface area (CS) of 50 m$^2$/cm$^3$ or more, an X-ray crystal grain diameter ($D_x$) of not more than 50 nm, not more than 10.0 basicity points/nm$^2$ and not more than 10.0 acidity points/nm$^2$.

2. A silver particle powder according to claim 1, wherein to the particle surface of which is adhered an organic protective agent that is an amino compound having a molecular weight of from 100 to 1000.

3. A silver particle disperse system constituted by the dispersion of the silver particle powder according to claim 1, in a non-polar or low-polarity organic dispersion medium, wherein average particle diameter ($D_{50}$) measured by a dynamic light-scattering method is not more than 100 nm and degree of dispersion ($D_{50}$)/($D_{TEM}$) is not more than 5.0.

4. The silver particle powder according to claim 2, wherein the organic protective agent is oleyl amine.

5. A silver particle disperse system constituted by the dispersion of the silver particle powder according to claim 2, in a non-polar or low-polarity organic dispersion medium, wherein average particle diameter ($D_{50}$) measured by a dynamic light-scattering method is not more than 100 nm and degree of dispersion ($D_{50}$)/($D_{TEM}$) is not more than 5.0.

\* \* \* \* \*